(12) United States Patent
Beck

(10) Patent No.: US 12,075,459 B2
(45) Date of Patent: Aug. 27, 2024

(54) SYSTEMS AND METHODS FOR MANAGING PRIORITY EXCEPTIONS FOR SHARED SPECTRUM RADIO SERVICES

(71) Applicant: CommScope Technologies LLC, Hickory, NC (US)

(72) Inventor: Andrew E. Beck, Ashburn, VA (US)

(73) Assignee: CommScope Technologies LLC, Claremont, NC (US)

( * ) Notice: Subject to any disclaimer, the term of this patent is extended or adjusted under 35 U.S.C. 154(b) by 321 days.

(21) Appl. No.: 17/682,316

(22) Filed: Feb. 28, 2022

(65) Prior Publication Data

US 2022/0361184 A1    Nov. 10, 2022

Related U.S. Application Data

(60) Provisional application No. 63/184,339, filed on May 5, 2021.

(51) Int. Cl.
*H04W 72/56* (2023.01)
*H04W 16/14* (2009.01)

(52) U.S. Cl.
CPC .......... *H04W 72/56* (2023.01); *H04W 16/14* (2013.01)

(58) Field of Classification Search
CPC .............................. H04W 72/56; H04W 16/14
See application file for complete search history.

(56) References Cited

U.S. PATENT DOCUMENTS

| | | | |
|---|---|---|---|
| 11,463,884 B2 * | 10/2022 | Hannan | H04B 17/102 |
| 2021/0385664 A1 * | 12/2021 | Nguyen | H04W 72/541 |
| 2022/0159658 A1 * | 5/2022 | Hannan | H04W 16/14 |

OTHER PUBLICATIONS

Wireless Innovation Forum, CBRS Protocols Technical Report, Document WINNF-TR-0205, Version 1.0.0, Aug. 1, 2017, Page(s): Cover page through 32, (c) 2017 The Software Defined Radio Forum Inc.
Wireless Innovation Forum, WINNF-TS-0112, Requirements for Commercial Operation in the U.S. 3550-3700 MHZ Citizens Broadband Radio Service Band, V1.9.1, Mar. 11, 2020, Page(s) Title page through 76.

(Continued)

*Primary Examiner* — Michael A Keller
(74) *Attorney, Agent, or Firm* — Fogg & Powers LLC

(57) ABSTRACT

Systems and methods for managing priority exceptions for shared spectrum radio services are provided. In one embodiment, a shared spectrum radio services system comprises: a spectrum access system (SAS) configured to adjust transmit power levels of one or more radios, wherein the one or more radios transmit on a protected frequency of a shared spectrum, wherein the SAS is associated with a protection area that comprises at least one dynamic incumbent RF system that transmits on the protected frequency; and wherein the SAS applies a standard transmit expiration time parameter to the one or more radios, the standard transmit expiration time parameter indicating a time of day at which authorization to transmit on the protected frequency expires; and wherein the SAS is configured to execute a transmit expiration parameter exception protocol to override the standard transmit expiration time parameter for at least one of the one or more radios.

14 Claims, 5 Drawing Sheets

(56) References Cited

OTHER PUBLICATIONS

Wireless Innovation Forum, "WINNF-TS-0112, Requirements for Commercial Operation in the U.S. 3550-3700 MHZ Citizens Broadband Radio Service Band" V1.4.1, Jan. 16, 2018, Page(s): Title Page through 69.
U.S. Patent and Trademark Office, "Notice of Allowance", U.S. Appl. No. 17/677,534, dated May 22, 24, pp. 1 through 20, Published: US.

* cited by examiner

SYSTEMS AND METHODS FOR MANAGING PRIORITY EXCEPTIONS FOR SHARED SPECTRUM RADIO SERVICES

CROSS-REFERENCE TO RELATED APPLICATIONS

The present application claims benefit of U.S. Patent Application Ser. No. 63/184,339, filed May 5, 2021; the entire contents of the aforementioned patent application are incorporated herein by reference as if set forth in its entirety.

BACKGROUND

A citizen's broadband radio service (CBRS) includes incumbent users of a shared spectrum and secondary users of the shared spectrum. An incumbent user may also be referred to as a primary user. Higher priority users of the shared spectrum have first, or highest, priority to utilize the shared spectrum. Incumbent users have priority access to transmit in the spectrum shared over the secondary users. Thus, the operation of secondary users is therefore managed so that the receivers of higher priority users' communications systems or radios are able to operate free of interference from the devices of secondary users. Examples of higher priority users often include government operating systems such as communications systems, operators of fixed satellite communications systems, and grandfathered, prior licensees of the frequency spectrum. Communications systems, as used herein, may include but are not limited to radar systems (or radars) and satellite ground stations. Free of interference as used herein does not mean an absence of interference, but rather means an acceptable level of interference which may be no interference or a finite level of interference. The acceptable level of interference may vary by geography, frequency spectrum, user type, license type, and/or other indicia.

Secondary users access the shared frequency spectrum by utilizing a citizen broadband radio service device (CBSD). More specifically, a CBSD is a radio that includes a transmitter coupled to an antenna. A CBSD may be used, for example, as part of a wireless network access point or telecommunications network base station. Within the context of the CBRS, there are different classes of CBSDs, namely general authorized access (GAA) CBSDs and priority access license (PAL) CBSDs. In the CBRS priority scheme, PAL users have second (or intermediate) priority, after incumbent users, to utilize the frequency spectrum. GAA users have the third (in this case, the lowest), priority under the CBRS priority scheme to utilize the frequency spectrum. GAA users may be permitted to operate a CBSD in the shared frequency spectrum when they do not interfere with communication systems of higher priority users (such as PAL or incumbent users).

A spectrum access system (SAS) is a component of the CBRS system which regulates the transmissions of CBSDs under the SAS's control so that they do not interfere with PAL or incumbent communication systems. As such, the SAS is the system that makes the determination as to whether to authorize a requesting secondary user to transmit in the spectrum shared with higher priority user(s) and/or the other secondary user(s). Such determinations are made on periodic basis where each SAS executes a Coordinated Periodic Activities among SASes (CPAS) process during which it exchanges information with other SASes about CBSDs operating in the neighborhood of a protection area and performs interference calculations.

The SAS protects two general types of incumbent users from interference, static and dynamic incumbents. Static incumbents operate at a fixed location and have a fixed set of frequencies that require protection from interference. Examples of static incumbents include Fixed Satellite Service operators and Grandfathered Wireless Broadband Licensees. The SAS protects static incumbents from interference by computing the aggregate signal level of all CBRS Devices (CBSDs) in the neighborhood of each incumbent.

Dynamic incumbents do not constantly utilize the shared spectrum and do not require constant protection from interference. Instead, dynamic incumbents are protected during those periods when they are using the shared spectrum, for the portion of shared spectrum they are using. There are several ways that a SAS can determine when dynamic incumbents come into operation so that CBSDs can be adjusted to avoid interference. These include the reporting of dynamic incumbent use to the SAS as detected by Environmental Sensing Capability (ESC) system receivers (which detect and communicates to the SAS the presence of signals from dynamic incumbents), and the utilization of Informing Incumbent Capability (IIC) which leverages the fact that, in some instances, dynamic incumbent use of the shared spectrum is episodic and potentially amenable to scheduling.

When a SAS becomes informed of spectrum use by a dynamic incumbent, regulations dictate a set time period for the SAS to coordinate adjustments to the CBSDs operating in the neighborhood of the protection area, and dictate a set time period for those CBSDs to comply with the adjustment demands from the SAS. As such, the CBSDs under the jurisdiction of a SAS to which they are registered maintain a communications connection with their SAS so that they can promptly respond to adjustment instructions. Moreover, the SAS utilizes the communications connection to periodically send to the CBSDs a parameter indicating a time of day at which their authorization to transmit expires. This is a failsafe mechanism to protect dynamic incumbents if the connection between a CBSD and the SAS is lost. That is, if a CBSD cannot communicate with the SAS, then the SAS has no way of informing the CBSD of dynamic incumbent activity. A CBSD that has lost communications with the SAS therefore assumes that all applicable frequencies are in use by a dynamic incumbent based on the time of day indicated by the parameter from the SAS, and accordingly suspends its own transmission at that time and essentially shut down their CBRS service.

The connection between the CBSD and the SAS may be lost for several reasons such as, but not limited to, if the SAS suffers an outage, if a network (for example, the Internet) or network equipment between the CBSD and SAS suffer an outage. The impact of such interruptions would not typically be isolated to a single CBSD, but would usually impact an entire CBSD operator network or CBRS community. The loss of CBRS service would continue until the cause of the outage is resolved and the CBSD to SAS communication is restored. This can be a devastating issue to a CBRS provider resulting is poor customer satisfaction and loss of revenue. This can also be a devastating issue to users of the CBRS service which may include essential services such as utilities, emergency systems or security systems.

SUMMARY

The Embodiments of the present disclosure provide methods and systems for managing priority exceptions for shared spectrum radio services and will be understood by reading and studying the following specification.

A shared spectrum radio services system, the system comprising: a spectrum access system (SAS) configured to adjust transmit power levels of one or more radios, wherein the one or more radios transmit on a protected frequency of a shared spectrum, wherein the SAS is associated with a protection area that comprises at least one dynamic incumbent RF system that transmits on the protected frequency; and wherein the SAS applies a standard transmit expiration time parameter to the one or more radios, the standard transmit expiration time parameter indicating a time of day at which authorization to transmit on the protected frequency expires; and wherein the SAS is configured to execute a transmit expiration parameter exception protocol to override the standard transmit expiration time parameter for at least one of the one or more radios.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide systems and methods for managing priority exceptions for shared spectrum radio services. More specifically, systems and methods are disclosed for implementing protocols that selectively reconfigure radios (such as CBSDs, for example) that utilize protected frequencies of shared spectrum to be able to maintain their services in operation during important events, even when communications with their spectrum access system is lost. Such events may include, but are not limited to, major sporting event or other gatherings where share spectrum radios are used for security or administration of the event, or a natural disaster, or other circumstance where shared spectrum radio services offer crucial value for a defined period of time, even above the value of protecting incumbents.

Some of the embodiments disclosed herein may be described in general terms, such as by using the general term "radio" for radio transceiver devices and equipment where a CBSD is one example of such a radio. Likewise, the term shared spectrum or shared spectrum system may be used where CBRS is an example of such a shared spectrum system. However, the terms CBRS and CBSD may be subsequently used for example purposes when illustrating such a system and a device, or their specifications.

Figure 1:
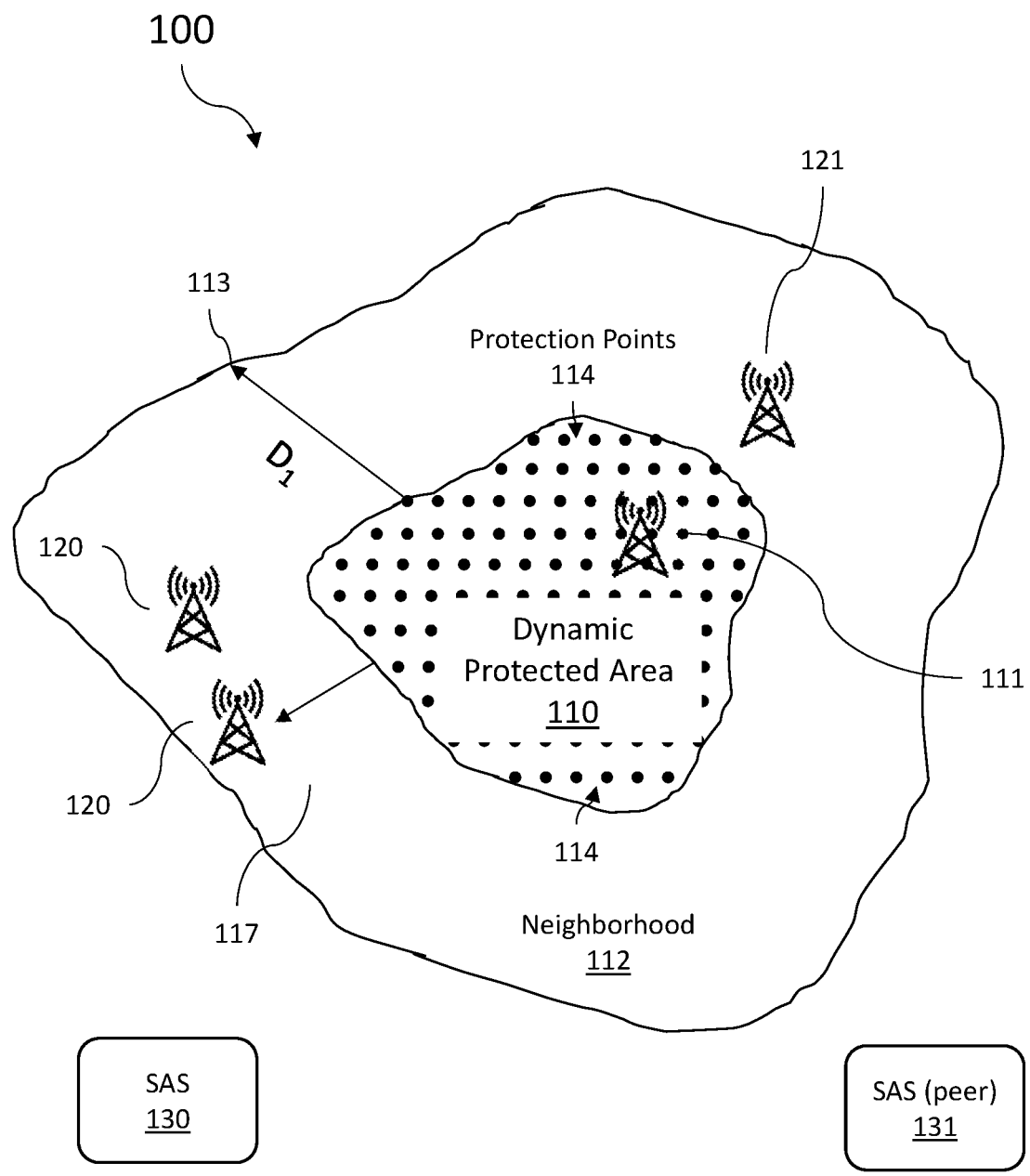
FIG. 1 is a diagram illustrating an example embodiment for managing priority exceptions for a shared spectrum radio service area.

FIG. 1 is a diagram illustrating generally at 100 an example embodiment of a shared spectrum radio services system that is configured to manage priority exceptions for a protection area (PA) 110 and neighborhood 112 around the protection area (PA) 110. In the embodiment shown in FIG. 1, the protection area 110 comprise an area within which users of a dynamic incumbent radio frequency (RF) system 111 conduct shared spectrum system operations on at least one protected frequency channel, $f_1$. Those frequency channels protected by the PA 110 and utilized by the dynamic incumbent users are referred to in this disclosure as "protected frequencies". The PA 110 may comprise any arbitrary closed shape surrounding a geographic region. In some embodiments, an outside boundary 113 of the neighborhood 112 may be defined as a linear distance, $D_1$, extending from a periphery of the PA 110. The protected area 110 may comprise a plurality of protection points 114. As the term is used herein, a protection point 114 defines a lateral geographic location within the protected area 110 which is to be protected from interference.

Non-priority radios 120 (such as CBSDs) may operate within the PA 110 or the neighborhood 112 of the PA 110 under the authorization of a spectrum access system (SAS). For example in FIG. 1, one or more radios 120 may operate under a grant authorized by a first SAS 130. Those radios 120 may each be referred to as a client radio 120 of the first SAS 130. One or more other non-priority radio (shown at 121) may operate within the neighborhood 112 under a grant authorized by a second SAS 131. In other embodiments, any number of different shared spectrum radios may operate in neighborhood 112 under grants from any one of a plurality of SAS. From the perspective of the SAS 130, the SAS 131 is considered, and referred to herein, as a "peer SAS". Accordingly, from the perspective of the SAS 130, the radio 121 managed by a peer SAS 131 may be considered, and referred to herein, as peer radios 121. Even though one or more of the radios 120, 121 may be located outside of the PA 110, their transmissions (if transmitted on one of the protected frequency channels), may still interfere with operations of dynamic incumbents 111 within the PA 110 depending on their transmit power and path loss and for that reason their operations are managed by one of the respective SAS 130, 131. The SAS 130 is assigned the task to manage its client radios 120 such that the equipment of operating dynamic incumbents 111 in the region within the PA 110 will be free of interference from radios operating within the PA 110 or the neighborhood 112. The PA 110 may also be referred to as a dynamic protection area (DPA) 110.

In some embodiments, the SAS 130 manages the operation of its radios 120 to avoid interference with operating dynamic incumbents 111 by banning those radios 120 within the PA 110 from operating on the protected frequency channels $f_1$ whenever the dynamic incumbent radio frequency (RF) system 111 is in operation. Those radios 120 positioned within the neighborhood 112 but not within the PA 110 are adjusted in power so such that the cumulative interference power from both client radios 120 and peer radios 121 as observed from any of the protection points 114 within the PA 110 are less than a predetermined allowed interference power limit in the protected frequency channels $f_1$. In some embodiments, the SAS 130 computes a-priori what adjustments will be needed to protect each dynamic incumbent RF system 111, and activates those adjustments on the radios 120 at the time the dynamic incumbent RF system 111 begins utilizing the shared spectrum in a given region. In some embodiments, the a-priori computations may be completed as part of the CPAS process. Once the dynamic incumbent RF system 111 completes operations, the radios 120 may be readjusted by the SAS 130 to resume transmissions at their prior authorized levels.

As mentioned above, the radios 120 and the SAS 130 maintain a communications connection so that power level or channel frequency adjustment instructions may be promptly transmitted to the radios 120 and implemented. For example, regulations may dictate that once SAS 130 is informed that dynamic incumbent RF system 111 is actively using the shared spectrum, there is a 300 second time period within which it will eliminate any interference from the radios 120 by transmitting to the radios 120 the appropriate adjustments. The regulations may further dictate a 60 second time period for the radios 120 to comply with the adjustment commands from the SAS 130. In order to monitor the availability of the communications connection, the radio 120 periodically initiates a check-in procedure, also referred to herein as a "heartbeat" procedure.

With the heartbeat procedure, a radio 120 initiates a heartbeat request message to the SAS 130 and the SAS 130 returns a heartbeat response message to that radio 120. The SAS 130 informs the radio 120 how often it should send a heartbeat request message. In the above case where regulation specifies a 300 second time period for the SAS 130 to eliminate interference, the SAS 130 may be configured to instruct the radio to transmit a periodic heartbeat request message at periodicity of less than 300 seconds. The SAS 130 may communicate instructions using the heartbeat response message for the radio 120 to transmit a heartbeat request message at a periodicity that reserves enough time for the radio 120 to react and make adjustments, and enough time to allow for a processing/transmission buffer. For example, the SAS 130 may instruct the radio 120 to send a heartbeat request message every 220 second to reserve a 60 second period for the radio 120 to make any adjustments and provide a 20 second margin to accommodate signal processing.

The SAS 130 also utilizes the heartbeat response message to communicate to the radio 120 the parameter indicating a time of day at which their authorization to transmit on the protected frequency expires. This transmit expiration time parameter is referred to herein as the transmitExpireTime parameter. In some embodiments, the transmitExpireTime parameter is expressed in Coordinated Universal Time (UTC) units, but it may instead be communicated in other formats. When the transmitExpireTime parameter is received by the radio 120, the value of the parameter is stored. The radio 120 comprises an internal clock that keeps time corresponding to the current time of day and if that internal clock indicates that the current time of day is equal to, or later than, the time indicated by the transmitExpireTime parameter, then the radio 120 will cease radio transmission within a predetermine time limit (such as within 60 second of the time indicated by the transmitExpireTime parameter).

However, as discussed above, should there be an interruption in communication between a radio 120 and the SAS 130, the radio 120 may not receive a heartbeat response message in reply to its heartbeat response message and therefore not able to receive power level adjustment instructions or transmitExpireTime parameter updates. If the radios 120 affected by the interruption are currently providing a crucial or otherwise important communications function, and the current time exceed the time indicated by the transmitExpireTime parameter, that important communications function will be interrupted. Embodiments of the present disclosure therefore incorporate a transmitExpireTime parameter exception or override protocol into the radio 120 and/or SAS 130 which may be selectively activated as discussed below.

Figure 2:
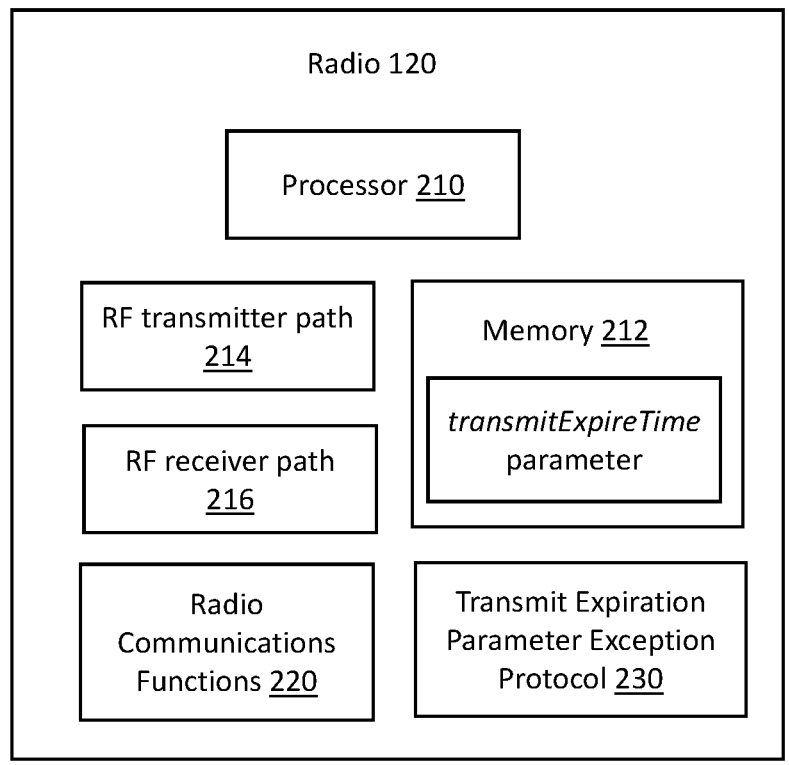
FIG. 2 is a block diagram illustrating an example embodiment of a radio configured to implement priority exceptions.
Figure 2A:
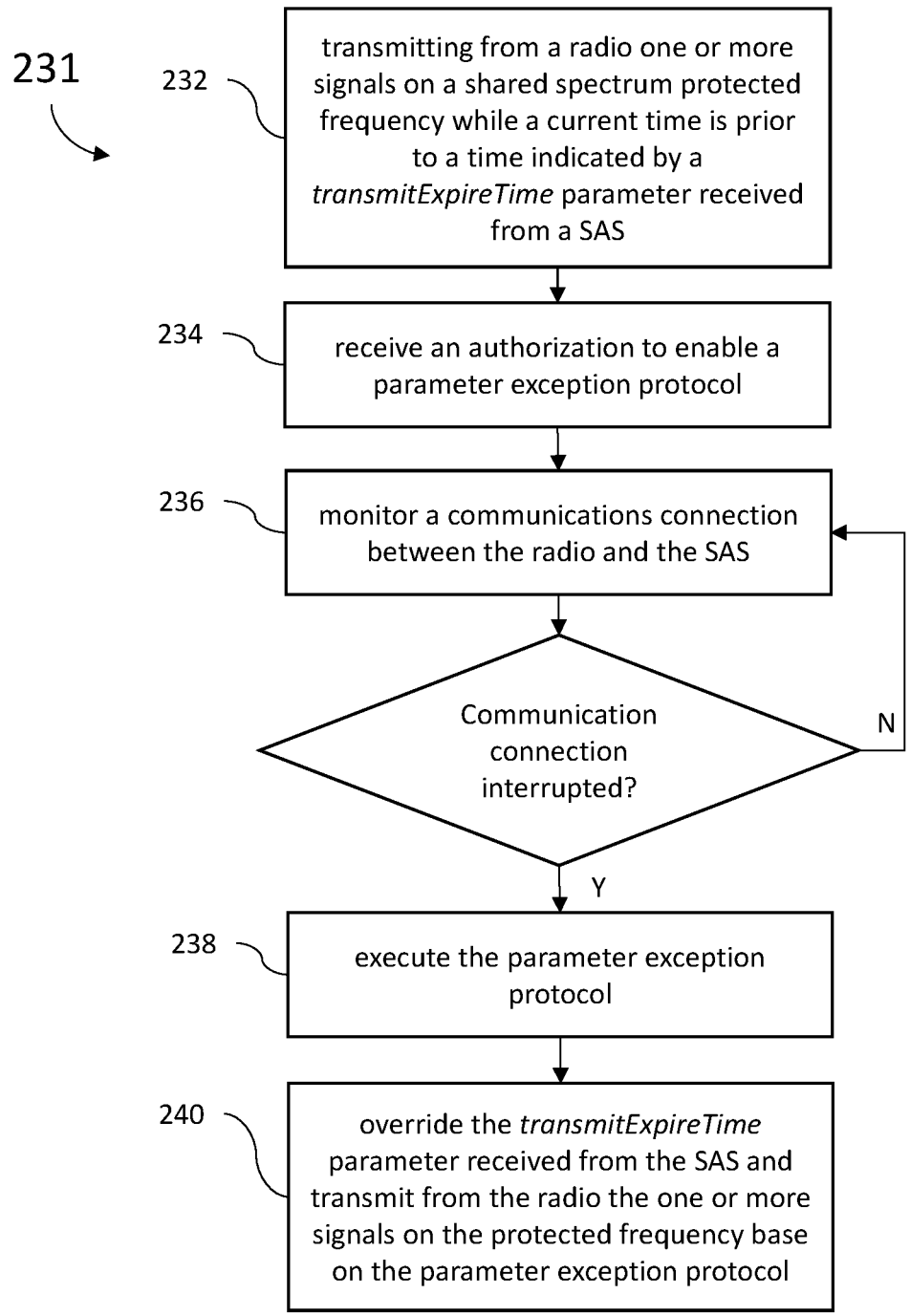
FIG. 2A is a diagram illustrating an example method embodiment for a radio configured to implement priority exceptions.

In one embodiment, a parameter exception protocol may be selectively executed by the radio 120 as illustrated by FIGS. 2 and 2A. It should be understood that the features and elements described herein with respect to the radio 120 in FIGS. 2 and 2A may be used in conjunction with, in combination with, or substituted for elements of any of the other embodiments discussed herein and vice versa. Further, it should be understood that the functions, structures, and other description of elements for embodiments described in FIGS. 2 and 2A may apply to like or similarly named or described elements across any of the figures and/or embodiments describe therewith and vice versa.

As shown in FIG. 2, the radio 120 comprises at least one processor 210 coupled to a memory 212, radio frequency (RF) transmitter path circuitry 214 and RF receiver path circuitry 216. The processor 210 and memory 212 together execute code to implement the various functions, methods, and features of the radio 120 described and disclosed herein. The RF transmitter path circuitry 214 and RF receiver path circuitry 216 each may comprise amplifiers, filters, up and down converters, digital-to-analog and analog-to-digital, and other circuitry that is configurable by the SAS 130 for implementing the function of a radio transceiver for use with the shared spectrum. The processor 210 executes one or more radio communications functions 220 to process incoming RF signals received by the receiver path circuitry 216, and to process RF signals for transmission on the by the transmitter path circuitry 214. In one embodiment, the processor 210 configures at least the transmitter path circuitry 214 for transmitting signals on protected frequencies at power levels authorized by the SAS 130. Moreover, the radio communications functions 220 manage transmission of the heartbeat request messages and processing of the heartbeat response messages discussed above. Accordingly, the radio communications functions 220 are responsive to the adjustment instructions from the SAS 130 to adjust transmission power levels or suspend transmissions to avoid interference with an active dynamic incumbent RF system 111.

The radio 120 also comprises transmit expiration parameter exception protocol 230. The processor 210 selectively executes the transmit expiration parameter exception protocol 230 to implement an exception that provisions the radio 120 to continue to operate past the time of day indicated by the transmitExpireTime parameter when the communication connection to the SAS 130 is lost. In some embodiments, the transmit expiration parameter exception protocol 230 would be maintained in a locked state during normal operation of the radio 120 so that the compliance with the transmitExpireTime parameter is maintained. Then, when an event occurs that justifies override of the transmitExpireTime parameter, the transmit expiration parameter exception protocol 230 is unlocked. In some embodiments, unlocking of the transmit expiration parameter exception protocol 230 may be performed locally at the radio 120. Alternatively, unlocking of the transmit expiration parameter exception protocol 230 may be performed remotely by a radio management system, the SAS 130, or by other authority, that send an unlocking instruction to the radio 120. In this manner an operator with a valid exception could have the radio 120 continue operation over the course of the exception event.

It should be noted that in some embodiments, the transmit expiration parameter exception protocol 230 may be unlocked, but not implemented by the processor 210 unless a loss of communications with the SAS 130 is also detected. For example, the processor 210 may transmit heartbeat requests messages and monitor for heartbeat response messages. If an expected heartbeat response message is not received within a preset timeout period, or after a preset number of attempts, the processor 210 concludes a loss of communications with the SAS 130 has occurred and executes the transmit expiration parameter exception protocol 230. In some embodiments, the processor 210 continues executing the transmit expiration parameter exception protocol 230 until such time as the communications with the SAS 130 is restored. In some embodiments, the transmit expiration parameter exception protocol 230 itself may be programmed with an internal transmitExpireTime parameter so that the processor 210 continues executing the transmit expiration parameter exception protocol 230 until the time of day indicated by the internal transmitExpireTime parameter comes to pass.

FIG. 2A is a flow chart illustrating one example embodiment of a parameter exception method 231 executed by the processor 210. The method begins at 232 with transmitting from a radio one or more signals on a shared spectrum protected frequency while a current time is prior to a time indicated by a transmitExpireTime parameter received from a SAS. The method proceeds to 234 with receiving an authorization to enable a parameter exception protocol. The method proceeds to 236 with monitoring a communications connection between the radio and the SAS and to 238 with executing the parameter exception protocol when the monitoring indicates that the communications connection has been interrupted. The method then proceeds to 240 with overriding the transmitExpireTime parameter received from a SAS and transmitting from the radio the one or more signals on the protected frequency base on the parameter exception protocol. In one embodiment, executing the parameter exception protocol and overriding the transmitExpireTime parameter may continue as long as the communication connection with the SAS is interrupted. Once the communication connection with the SAS is restored, the method proceeds back to 232 with compiling with transmitExpireTime parameters received from the SAS.

Figure 3:
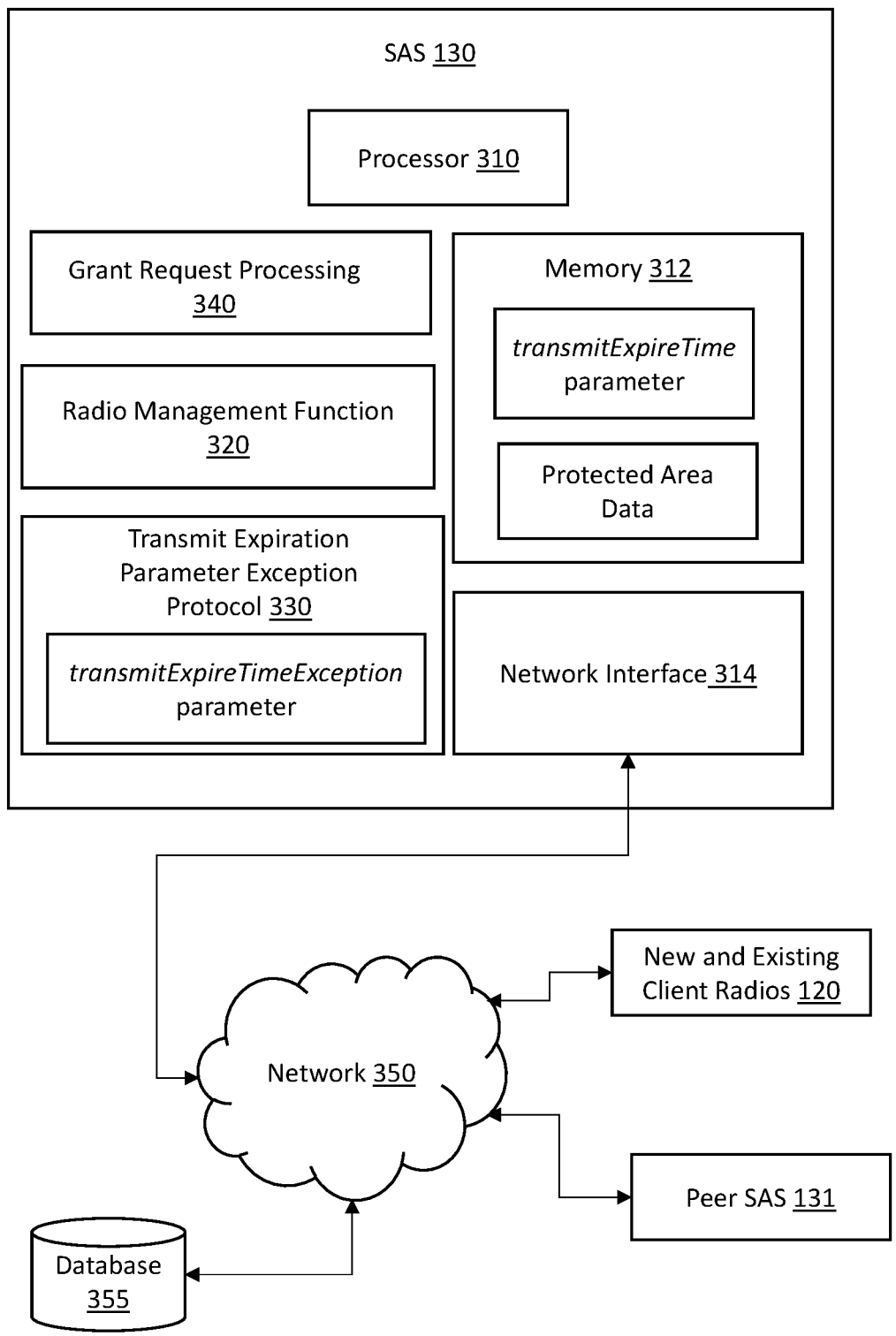
FIG. 3 is a block diagram illustrating an example embodiment of a SAS.
Figure 3A:
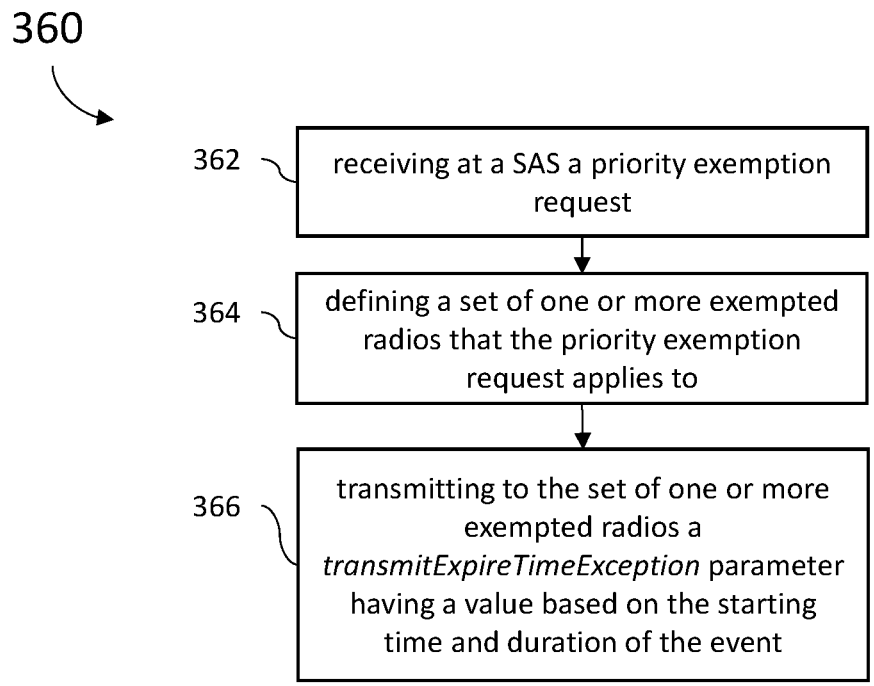
FIG. 3A is a diagram illustrating an example method embodiment for a SAS configured to implement priority exceptions.

In another embodiment, a parameter exception protocol may be selectively executed by the SAS 130 as illustrated by FIGS. 3 and 3A. It should be understood that the features and elements described herein with respect to the SAS 130 in FIGS. 3 and 3A may be used in conjunction with, in combination with, or substituted for elements of any of the other embodiments discussed herein and vice versa. Further, it should be understood that the functions, structures, and other description of elements for embodiments described in FIGS. 3 and 3A may apply to like or similarly named or described elements across any of the figures and/or embodiments describe therewith and vice versa.

As shown in FIG. 3, the SAS 130 includes at least one processor 310 coupled to a memory 312, which together execute code to implement the various functions, methods, and features of the SAS 130 described and disclosed herein. Although the SAS 130 is illustrated in FIG. 3 as a singular computing system, it should be understood than in other embodiments the functions and elements of the SAS 130 described herein may be distributed over several computing systems.

The SAS 130 also includes at least one network interface 314 configured to communicatively couple the SAS 130 to a network 350 (such as the Internet, or a SAS operator's proprietary network, for example). In some embodiments, the SAS 130, via network 350, is optionally further communicatively coupled to at least one external database 355. In some embodiments, the database 355 comprises a database of data about incumbent users 111 (e.g., location of protection points 114 for an incumbent user, the type of incumbent user, and corresponding interference thresholds). Optionally, the external database 355 may be managed by a government agency (e.g., the U.S. Federal Communications Commission) and/or by a standard body (e.g., WInnForum).

The SAS 130 includes a grant request processing function 340 which is executed by the processor 310 and comprises code for spectrum access system interference calculation management. The grant request processing function 340 may also manage execution of the CPAS process for performing interference calculations, Iterative Allocation Part (IAP) functions, Full Activity Dump (FAD) exchanges, and other operations of the SAS 130 performed in preparation for, or during, CPAS periods. The memory 312 may store data which defines the boundaries of one or more PA 110 the locations of protection points 114 within the PA 110, and identifies one or more protected frequency channels associated with each PA 110 that are protected for use by dynamic incumber users. In one embodiment, the SAS 130 may communicate with new and existing client radios 120 via the network interface 314 connection to the network 350. For example, a new client radio 120 may send the SAS 130 a new radio grant request via the network 350.

The processor 310 also executes one or more radio management functions 320 to process incoming heartbeat request messages from the radios 120 registered to that SAS 130, and transmit heartbeat response messages back to the radios 120 as discussed above. The SAS 130 also comprises a transmit expiration parameter exception protocol 330. The processor 310 selectively executes the transmit expiration parameter exception protocol 330 to implement an exception that provisions one or more of the radios 120 to continue to operate past the time of day indicated by the standard transmitExpireTime parameter should the communication connection to the SAS 130 become lost.

When the transmit expiration parameter exception protocol 330 is executed by the processor 310, the SAS 130 instructs the radio 120 to use an extended transmit expire time period (that is, a period that extends beyond the time of day indicated by the standard transmitExpireTime parameter) in cases where one or more of the radios 120 operation is authorized and prioritized above dynamic incumbent RF system 111 protection on a limited time basis. In these cases, radios 120 to which the dynamic incumbent protection applies are designated by the parameter exception protocol 330 and a transmit expiration time exception parameter (referred to herein as the transmitExpireTimeException parameter) is sent to those radios 120. The transmitExpireTimeException parameter value would indicate a time that extends sufficiently into the future to encompass the life of the exception event. In some embodiments, the transmitExpireTimeException parameter indicates a time further into the future than the standard transmitExpireTime parameter. In some embodiments, the transmitExpireTimeException parameter would be transmitted to the exempted radios 120 in the heartbeat response messages, replacing the standard transnitExpireTime parameter in that message. As such, no modification to the radio 120 is needed to implement this embodiment. Radios 120 that are not associated with the exception even (and thus not exempted) would continue to receive from the SAS the standard transmitExpireTime parameter in the heartbeat response messages and continue operation under standard regulations. Once the exception event is complete and the exception period expires, the SAS 130 would revert to sending radio 120 the normal transmitExpireTime value.

In some embodiments, the logic applied by the parameter exception protocol 330 to determine when to use the transmitExpireTimeException parameter in place of the standard transmitExpireTime parameter, and what value to assign to the transmitExpireTimeException parameter, is based on first determining which radios 120 will provide service into the event subject to the exception. The duration of the event would be used to calculate the transmitExpireTimeException value. In some embodiments, the SAS 130 may receive a priority exception request via the network 350, with the priority exception request indicating the location of the event subject to the exception, and the planned starting time and duration of the event, or alternatively the ending time of the event. In some embodiments, the duration of the event may be derived from the starting time and ending time. Then based on that information, the parameter exception protocol 330 determines which of the radios 120 are to receive the transmitExpireTimeException value instead of the transmitExpireTime value. This determination may further be based on the location of the dynamic incumbent RF system 111, which would be known by the SAS 130.

Should a loss of the communication connection between one or more of the exempted radios 120 occur during the event, the applicable radios 120 receiving the transmitExpireTimeException value would be able to continue service through the event up to the time of day indicated by the transmitExpireTimeException value. After the event is over, the SAS 130 would cease the transmit expiration parameter exception protocol 330 and revert to sending heartbeat response messages having the standard transmitExpireTime value. If the communications connection with the SAS 130 is not restored by the conclusion of the event, the radio 120 would automatically stop transmissions as the transmitExpireTimeException value associated with the event would be complied with by the radio 120 in the same manner as a standard transmitExpireTime value, and trigger a transmit authorization expiry.

FIG. 3A is a flow chart illustrating one example embodiment of a parameter exception method 360 executed by the processor 310 of SAS 130. As discussed above, the SAS 130 has the responsibility to manage the operation of its client radios 120 such that the equipment of operating dynamic incumbents 111 in the region within the PA 110 will be free of interference from radios operating within the PA 110 or the neighborhood 112.

The method begins at 362 with receiving at the SAS 130 a priority exemption request. In some embodiments, the priority exemption request may be received by the SAS 130 via the network 350. The priority exemption request indicates to the SAS 130 that an event is planned that will utilize the services of one or more of the radios 120. Moreover, that event has been designated as being sufficiently important that interruption of communication between the SAS 130 and the one or more radio 120 should not result loss of the services. The priority exemption request includes both the starting time and duration of the event, or alternatively the ending time of the event.

The method proceeds to 364 with defining a set of one or more exempted radios 120 that the priority exemption request applies to. In some embodiments, the priority exemption request may itself identify the one or more radios 120 for which the exception will apply. In other embodiments, the priority exemption request may give the location of the event, and the SAS 130 itself will determine which of the radio 120 that it manages will receive the exception.

The method proceeds to 366 with transmitting to the set of one or more exempted radios 120 a transmitExpireTimeException parameter having a value based on the starting time and duration of the event. If an interruption occurs during the event in the communication connection between the SAS 130 and the exempted radios 120, those exempted radios 120 will be able to continue service through the event up to the time of day indicated by the transmitExpireTimeException value. In contrast, any client radios 120 of the SAS 130 that are not defined as belonging to the set of exempted radios 120 will receive continue to receive the standard (i.e., default) the transmitExpireTime value.

EXAMPLE EMBODIMENTS

Example 1 includes a method for managing priority exceptions for a shared spectrum radio services system, the system comprising a spectrum access system (SAS) configured to manage one or more radios that transmit on a protected frequency of a shared spectrum, wherein at least one dynamic incumbent radio in a protected area operates on the protected frequency, the method comprising: receiving at the SAS a priority exemption request associated with an event; defining a set of one or more exempted radios that the priority exemption request applies to from the one or more radios; and transmitting to the set of one or more exempted radios a transmit expiration time exception parameter having a value based on a starting time and duration of the event.

Example 2 includes the method of Example 1, further comprising: transmitting to at least one of the one or more radios that is not included in the set of one or more exempted radios a standard transmit expiration time parameter.

Example 3 includes the method of Example 2, wherein the standard transmit expiration time parameter comprises a time of day value stored in a memory of the SAS.

Example 4 includes the method of any of Examples 2-3, wherein the standard transmit expiration time parameter and the transmit expiration time exception parameter each indicate a time of day at which authorization to transmit expires; wherein the transmit expiration time exception parameter indicates a time further into the future than the standard transmit expiration time parameter.

Example 5 includes the method of any of Examples 1-4, further comprising: receiving a heartbeat request message at the SAS from a first radio of the set of one or more exempted radios; wherein transmitting the transmit expiration time exception parameter to the set of one or more exempted radios comprises transmitting the transmit expiration time exception parameter in a heartbeat response message that is responsive to the heartbeat request message.

Example 6 includes the method of Example 5, wherein the SAS transmits an instruction to the first radio indicating a periodicity for the first radio to transmit the heartbeat request message.

Example 7 includes the method of any of Examples 1-6, wherein the priority exemption request identifies to the SAS which of the one or more radios belong to the set of one or more exempted radios that the transmit expiration time exception parameter is transmitted to.

Example 8 includes the method of any of Examples 1-7, wherein the priority exemption request identifies to the SAS a location of the event, the method further comprising: determining by the SAS which of the one or more radios belong to the set of one or more exempted radios that the transmit expiration time exception parameter is transmitted to based on the location of the event.

Example 9 includes the method of any of Examples 1-8, wherein the priority exemption request identifies to the SAS the starting time and duration of the event.

Example 10 includes the method of any of Examples 1-9, wherein the shared spectrum radio services system is a citizen's broadband radio service (CBRS) system, the one or more radios are each citizen broadband radio service devices (CBSDs), and the SAS is a SAS of the CBRS.

Example 11 includes a method for managing priority exceptions for a shared spectrum radio services system, the system comprising a spectrum access system (SAS) configured to manage one or more radios that transmit on a protected frequency of a shared spectrum, wherein at least one dynamic incumbent radio operates on the protected frequency, the method comprising: transmitting from a radio one or more signals on the protected frequency of the shared spectrum while a current time is prior to a time indicated by a standard transmit expiration time parameter received from the SAS; receiving an authorization to enable a parameter exception protocol; monitoring a communications connection between the radio and the SAS; and when the communication connection is determined to be interrupted: executing the parameter exception protocol; and overriding the standard transmit expiration time parameter received from the SAS and transmit from the radio the one or more signals on the protected frequency based on the parameter exception protocol.

Example 12 includes the method of Example 11, wherein the parameter exception protocol defines a transmit expiration time exception parameter.

Example 13 includes the method of Example 12, wherein the standard transmit expiration time parameter and the transmit expiration time exception parameter each indicate a time of day at which authorization for the radio to transmit expires; wherein the transmit expiration time exception parameter indicates a time further into the future than the standard transmit expiration time parameter.

Example 14 includes the method of any of Examples 11-13, wherein monitoring a communications connection between the radio and the SAS comprises: periodically transmitting from the radio a heartbeat request message and monitoring for a heartbeat response message received in reply to the heartbeat request message.

Example 15 includes the method of Example 14, further comprising: determining when the communication connection is interrupted based on either: when the heartbeat response message is not received within a preset timeout period; or when the heartbeat response message is not received after transmitting the heartbeat request message a preset number of attempts.

Example 16 includes the method of any of Examples 11-15, wherein the shared spectrum radio services system is a citizen's broadband radio service (CBRS) system, the one or more radios are each citizen broadband radio service devices (CBSDs), and the SAS is a SAS of the CBRS.

Example 17 includes a shared spectrum radio services system, the system comprising: a spectrum access system (SAS) configured to adjust transmit power levels of one or more radios, wherein the one or more radios transmit on a protected frequency of a shared spectrum, wherein the SAS is associated with a protection area that comprises at least one dynamic incumbent RF system that transmits on the protected frequency; and wherein the SAS applies a standard transmit expiration time parameter to the one or more radios, the standard transmit expiration time parameter indicating a time of day at which authorization to transmit on the protected frequency expires; and wherein the SAS is configured to execute a transmit expiration parameter exception protocol to override the standard transmit expiration time parameter for at least one of the one or more radios.

Example 18 includes the system of Example 17, wherein the SAS comprises: a processor coupled to a memory; wherein the processor is configured to: receive at the SAS a priority exemption request associated with an event; define a set of one or more exempted radios that the priority exemption request applies to from the one or more radios; and transmit to the set of one or more exempted radios a transmit expiration time exception parameter having a value based on a starting time and duration of the event, wherein each of the set of one or more exempted radios override the standard transmit expiration time parameter by utilizing the transmit expiration time exception parameter in place of the standard transmit expiration time parameter.

Example 19 includes the system of Example 18, wherein the parameter exception protocol defines a transmit expiration time exception parameter and instructs the processor to utilize the transmit expiration time exception parameter in place of the standard transmit expiration time parameter.

Example 20 includes the system of any of Examples 17-19, wherein the shared spectrum radio services system is a citizen's broadband radio service (CBRS) system, the one or more radios are each citizen broadband radio service devices (CBSDs), and the SAS is a SAS of the CBRS.

Example 21 includes a radio for a shared spectrum radio services system that comprises a spectrum access system (SAS) configured to adjust transmit power levels of one or more radios that transmit on a protected frequency of a shared spectrum, wherein the SAS is associated with a protection area that comprises at least one dynamic incumbent RF system that transmits on the protected frequency, and wherein the SAS applies a standard transmit expiration time parameter to the one or more radios, the standard transmit expiration time parameter indicating a time of day at which authorization to transmit on the protected frequency expires, the radio comprising: a processor coupled to a memory; a radio frequency (RF) transmitter path; and a RF receiver path; wherein the processor is configured to: receive an authorization to enable a parameter exception protocol; monitor, using the RF transmitter path and the RF receiver path, a communications connection between the radio and the SAS to determine when the communication connection is determined to be interrupted; and when the communication connection is determined to be interrupted, execute the parameter exception protocol, wherein the parameter exception protocol instructs the processor to override the standard transmit expiration time parameter.

Example 22 includes the system of Example 21, wherein the parameter exception protocol defines a transmit expiration time exception parameter and instructs the processor to utilize the transmit expiration time exception parameter in place of the standard transmit expiration time parameter.

Example 23 includes the system of any of Examples 21-22, wherein the shared spectrum radio services system is a citizen's broadband radio service (CBRS) system, the one or more radios are each citizen broadband radio service devices (CBSDs), and the SAS is a SAS of the CBRS.

In various alternative embodiments, system and/or device elements, method steps, or example implementations described throughout this disclosure (such as any of the spectrum access system, CBSDs, radios, radio communication functions, transmit expiration parameter exception protocols, grant request processing functions, radio management functions, databases, network interface, or any controllers, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, wireless radio communications related terms such as: spectrum access system (SAS), citizens broadband radio service (CBRS), shared spectrum, radio, citizen broadband radio service device (CBSD), Coordinated Periodic Activities among SASes (CPAS), protected area, protection point, processor, memory, database, network interface, network, refer to the names of elements that would be immediately recognized and understood by those of skill in the art of telecommunications and networks and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for managing priority exceptions for a shared spectrum radio services system, the system comprising a spectrum access system (SAS) configured to manage one or more radios that transmit on a protected frequency of a shared spectrum, wherein at least one dynamic incumbent radio in a protected area operates on the protected frequency, the method comprising:
   receiving at the SAS a priority exemption request associated with an event;
   defining a set of one or more exempted radios that the priority exemption request applies to from the one or more radios; and
   transmitting to the set of one or more exempted radios a transmit expiration time exception parameter having a value based on a starting time and duration of the event.

2. The method of claim 1, further comprising:
   transmitting to at least one of the one or more radios that is not included in the set of one or more exempted radios a standard transmit expiration time parameter.

3. The method of claim 2, wherein the standard transmit expiration time parameter comprises a time of day value stored in a memory of the SAS.

4. The method of claim 2, wherein the standard transmit expiration time parameter and the transmit expiration time exception parameter each indicate a time of day at which authorization to transmit expires;
   wherein the transmit expiration time exception parameter indicates a time further into the future than the standard transmit expiration time parameter.

5. The method of claim 1, further comprising:
   receiving a heartbeat request message at the SAS from a first radio of the set of one or more exempted radios;
   wherein transmitting the transmit expiration time exception parameter to the set of one or more exempted radios comprises transmitting the transmit expiration time exception parameter in a heartbeat response message that is responsive to the heartbeat request message.

6. The method of claim 5, wherein the SAS transmits an instruction to the first radio indicating a periodicity for the first radio to transmit the heartbeat request message.

7. The method of claim 1, wherein the priority exemption request identifies to the SAS which of the one or more radios belong to the set of one or more exempted radios that the transmit expiration time exception parameter is transmitted to.

8. The method of claim 1, wherein the priority exemption request identifies to the SAS a location of the event, the method further comprising:
   determining by the SAS which of the one or more radios belong to the set of one or more exempted radios that the transmit expiration time exception parameter is transmitted to based on the location of the event.

9. The method of claim 1, wherein the priority exemption request identifies to the SAS the starting time and duration of the event.

10. The method of claim 1, wherein the shared spectrum radio services system is a citizen's broadband radio service (CBRS) system, the one or more radios are each citizen broadband radio service devices (CBSDs), and the SAS is a SAS of the CBRS.

11. A shared spectrum radio services system, the system comprising:
   a spectrum access system (SAS) configured to adjust transmit power levels of one or more radios, wherein the one or more radios transmit on a protected frequency of a shared spectrum, wherein the SAS is associated with a protection area that comprises at least one dynamic incumbent RF system that transmits on the protected frequency; and wherein the SAS applies a standard transmit expiration time parameter to the one or more radios, the standard transmit expiration time parameter indicating a time of day at which authorization to transmit on the protected frequency expires; and wherein the SAS is configured to execute a transmit expiration parameter exception protocol to override the standard transmit expiration time parameter for at least one of the one or more radios.

12. The system of claim 11, wherein the SAS comprises:
a processor coupled to a memory;
wherein the processor is configured to:
   receive at the SAS a priority exemption request associated with an event;
   define a set of one or more exempted radios that the priority exemption request applies to from the one or more radios; and
   transmit to the set of one or more exempted radios a transmit expiration time exception parameter having a value based on a starting time and duration of the event, wherein each of the set of one or more exempted radios override the standard transmit expiration time parameter by utilizing the transmit expiration time exception parameter in place of the standard transmit expiration time parameter.

13. The system of claim 12, wherein the parameter exception protocol defines a transmit expiration time exception parameter and instructs the processor to utilize the transmit expiration time exception parameter in place of the standard transmit expiration time parameter.

14. The system of claim 11, wherein the shared spectrum radio services system is a citizen's broadband radio service (CBRS) system, the one or more radios are each citizen broadband radio service devices (CBSDs), and the SAS is a SAS of the CBRS.

* * * * *